United States Patent [19]

Reichenbacher et al.

[11] 3,878,074

[45] Apr. 15, 1975

[54] VINYLATION OF AROMATIC COMPOUNDS

[75] Inventors: Paul H. Reichenbacher, Elk Grove Village; Theresa M. Forsythe, Mount Prospect, both of Ill.

[73] Assignee: Universal Oil Products Company, Des Plaines, Ill.

[22] Filed: July 26, 1973

[21] Appl. No.: 382,781

[52] U.S. Cl. .......................... 204/158 R; 204/162 R
[51] Int. Cl. ................................................ B01j 1/10
[58] Field of Search .................... 204/158 R, 162 R

[56] References Cited
UNITED STATES PATENTS 2,384,085  9/1945  Gerhart........................ 204/162 R
3,701,722  10/1972  Heckert ........................ 204/158 R

OTHER PUBLICATIONS

Bryce–Smith et al., Chemistry & Industry (April 8, 1961), p. 429.

*Primary Examiner*—Howard S. Williams
*Attorney, Agent, or Firm*—James R. Hoatson, Jr.; Raymond H. Nelson; William H. Page, II

[57] ABSTRACT

Aromatic compounds are vinylated by reaction with an ethylenic compound in the presence of certain metallic compounds and an organic solvent, the mixture being photocatalyzed by exposure to the emission from a light source having a wave length less than about 4,000A.

13 Claims, No Drawings

VINYLATION OF AROMATIC COMPOUNDS

This invention relates to a process for the photocatalyzed vinylation of an aromatic compound with an ethylenic compound. More specifically, the invention is concerned with a process for the vinylation of aromatic compounds to form vinyl-substituted aromatic compounds which are useful in the chemical industry, said catalytic effect being supplied by emission from a light source having a wave length less than that of visible light.

Heretofore, the prior art has shown a process for the reaction of an organometallic compound with an ethylenically unsaturated compound in the presence of a salt of a metal selected from Group VIII of the Periodic Table. It is noted that the reaction involves the aforementioned organo-metallic compound by reacting a salt of a Group VIII metal with a carbo-alkoxy mercury, tin, or lead compound prior to the reaction with an ethylenically unsaturated hydrocarbon or to optionally form this compound in situ. However, in contradistinction to this, it has now been discovered that aromatic compounds may be reacted with an ethylenic compound in the presence of a combination of metal salts and an oxygen-containing compound, said mixture being subjected to the emission from a light having certain wave lengths, to form a vinyl-substituted aromatic compound. The reaction of the present invention involves the ethylenic compound and the aromatic compound directly without the necessary prior formation of the organometallic compound.

The products which are prepared according to the process of this invention and which comprise aromatic compounds containing a substituent which possesses an ethylenic linkage therein are useful in the chemical industry and particularly the aroma industry. The compounds thus prepared are useful as intermediates in the preparation of aroma chemicals. For example, methyl cinnamate, which possesses a balsamic odor, may be prepared according to this process. The compound beta-styryl acetate may be hydrogenated to form particularly beta-phenylethyl acetate and thereafter hydrolyzed to form beta-phenylethanol which possesses an aroma of attar of rose. Another compound which may be formed from the hydrolysis of beta-styryl acetate is phenylacetaldehyde, this compound adding hyacinth, jonquil or narcissus notes to aroma chemicals. Yet another compound which may be prepared according to the process of this invention is 2-(2-hydroxyphenyl)-acrylic acid or its esters, which may be converted to coumarin which possesses a fragrant odor similar to vanilla and which is used as a deodorizing and odor enhancing agent in perfumes, soaps, tobacco, inks, rubber, and other products where aromatic ingredients are required. The aforementioned products are useful in the preparation of fragrances or aroma compositions which are added to cosmetic and toiletry articles such as perfumes, colognes, soaps, talcs, bath powders, etc. whereby the aforementioned compounds will possess desirable and pleasing scents.

It is therefore an object of this invention to provide a novel process for preparing substituted aromatic compounds in which the substituent possesses an ethylenic linkage.

A further object of this invention is to provide a process for the direct reaction of an ethylenic compound with an aromatic compound in the presence of certain metals or salts thereof, the mixture being irradiated with an emission from a light source having a wave length less than 4000A, to directly form the desired product.

In one aspect an embodiment of this invention resides in a process for the photocatalytic vinylation of an aromatic compound possessing the generic formula:

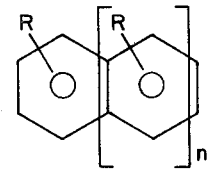

in which R is selected from the group consisting of hydrogen, hydroxyl, alkyl, alkoxy aryl, alkaryl, aralkyl, cycloalkyl and halogen radicals and $n$ is an integer of from 0 to 2, which comprises reacting said aromatic compound with an ethylenic compound possessing the formula:

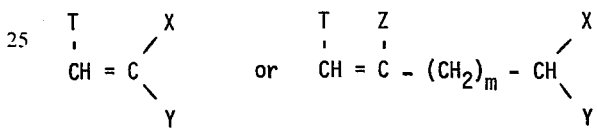

in which T, X, Y and Z are independently selected from the group consisting of hydrogen, alkyl

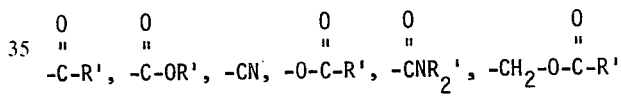

and OR' radicals, R' being selected from the group consisting of hydrogen, alkyl, aryl, cycloalkyl, aralkyl and alkaryl radicals and $m$ is an integer of from 0 to 16 in the presence of a salt of a metal of Group VIII, a salt of a transition metal and an oxygen-containing gas at reaction conditions, said mixture being exposed to the emission from a light source having a wave length of less than 4000A.

A specific embodiment of this invention is found in a process for the photocatalytic vinylation of an aromatic compound which comprises reacting a phenol with methyl acrylate in the presence of palladium acetylacetonate, copper acetate, air and acetic acid, said mixture being subjected to emission from a light source having a wave length less than about 4000A at a temperature in the range of from about 20° to about 200° C. and a pressure in the range of from about atmospheric to about 2,000 pounds per square inch, and recovering the resultant coumarin.

Other objects and embodiments will be found in the following further detailed description of the present invention.

As hereinbefore set forth the present invention is concerned with a process for the photocatalytic vinylation of an aromatic compound with an ethylenic compound. The desired compounds are prepared by reacting an aromatic compound which may contain various substituents thereon with a second compound which contains an ethylenic linkage, said reaction being effected, if so desired, in an organic solvent in the presence of certain metal-containing compounds of a type hereinafter set forth in greater detail and an oxygen-containing gas, the reaction mixture being subjected to the emission of a light source having a wave length less than about 4000A.

Examples of organic compounds which may be reacted in the process will possess the generic formula:

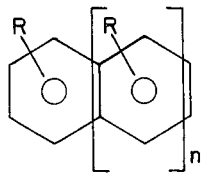

in which R is selected from the group consisting of hydrogen, hydroxyl, alkyl, alkoxyl, aryl, alkaryl, aralkyl, cycloalkyl, and halogen (preferably chlorine) radicals and $n$ is an integer of from 0 to about 2. Specific examples of these compounds will include benzene, phenol, toluene, ethylbenzene, n-propylbenzene, isopropylbenzene (cumene), n-butylbenzene, sec-butylbenzene, t-butylbenzene, n-amylbenzene, sec-amylbenzene, etc., anisole, phenetole, propyl phenyl ether, isopropyl phenyl ether, butyl phenyl ether, etc., phenylbenzene, benzylbenzene, o-tolylbenzene, m-tolylbenzene, p-tolylbenzene, cyclohexylbenzene, cyclopentylbenzene, chlorobenzene, 1-methylnaphthalene, 2-methylnaphthalene, 1,6-dimethylnaphthalene, 1,8-dimethylnaphthalene, 1-ethylnaphthalene, 2-ethylnaphthalene, 1,2-diethylnaphthalene, 1-methoxynaphthalene, 2-methoxynaphthalene, 1,6-methoxynaphthalene, 1,8-methoxynaphthalene, 1-ethoxynaphthalene, 2-ethoxynaphthalene, 1-phenylnaphthalene, 2-phenylnaphthalene, 1-p-tolylnaphthalene, 2-p-tolylnaphthalene, 1-o-tolylnaphthalene, 1-m-tolylnaphthalene, 1-benzylnaphthalene, 2-benzylnaphthalene, 1-cyclopentylnaphthalene, 2-cyclohexylnaphthalene, 1-chloronaphthalene, 2-chloronaphthalene, 1,6-dichloronaphthalene, the corresponding anthracenes, etc.

The aforementioned aromatic compounds are reacted with an ethylenic compound which possesses the generic formula:

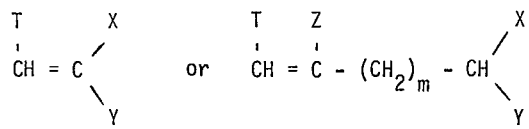

in which T, X, Y and Z are selected independently from the group consisting of hydrogen, alkyl,

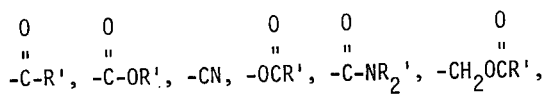

and OR' radicals, R' being selected from the group consisting of hydrogen, alkyl, aryl, cycloalkyl, aralkyl, alkaryl radicals and $m$ is an integer of from 0 to about 16. Some specific examples of these compounds which contain an ethylenic linkage will include methyl vinyl ketone, ethyl vinyl ketone, propyl vinyl ketone, butyl vinyl ketone, methyl propenyl ketone, ethyl propenyl ketone, propyl propenyl ketone, phenyl vinyl ketone, phenyl propenyl ketone, cyclopentyl vinyl ketone, cyclohexyl vinyl ketone, cyclopentyl propenyl ketone, cyclohexyl propenyl ketone, benzyl vinyl ketone, benzyl propenyl ketone, o-tolyl vinyl ketone, m-tolyl vinyl ketone, p-tolyl vinyl ketone, o-tolyl propenyl ketone, m-tolyl propenyl ketone, p-tolyl propenyl ketone, acrolein, acrylic acid, allyl acetate, isobutenyl acetate, isobutenyl propionate, methallyl acetate, methyl acrylate, ethyl acrylate, propyl acrylate, isopropyl acrylate, phenyl acrylate, benzyl acrylate, cyclopentyl acrylate, cyclohexyl acrylate, o-tolyl acrylate, m-tolyl acrylate, p-tolyl acrylate, methyl methacrylate, ethyl methacrylate, propyl methacrylate, isopropyl methacrylate, phenyl methacrylate, benzyl methacrylate, cyclopentyl methacrylate, cyclohexyl methacrylate, o-tolyl methacrylate, m-tolyl methacrylate, p-tolyl methacrylate, acrylonitrile, vinyl acetate, vinyl propionate, vinyl benzoate, vinyl cyclohexane carboxylic acid, acrylamide, N-methylacrylamide, N-ethylacrylamide, N-propylacrylamide, N-isopropylacrylamide, N-phenylacrylamide, N-benzylacrylamide, N-o-tolylacrylamide, N-m-tolylacrylamide, N-p-tolylacrylamide, N-cyclopentylacrylamide, N-cyclohexylacrylamide, N,N-dimethylacrylamide, N,N-diethylacrylamide, N,N-dipropylacrylamide, N,N-diisopropylacrylamide, N,N-diphenylacrylamide, N,N-dibenzylacrylamide, N,N-di-o-tolylacrylamide, N,N-di-m-tolylacrylamide, N,N-di-p-tolylacrylamide, N,N-dicyclopentylacrylamide, N,N-dicyclohexylacrylamide, etc. It is to be understood that the aforementioned aromatic compounds and compounds containing an ethylenic linkage are only representative of the classes of compounds which may be utilized as starting materials, and that the present invention is not necessarily limited thereto.

The condensation between the organic compound and the ethylenic compound of the types hereinbefore set forth in greater detail is effected in the presence of a salt of a metal of Group VIII of the Periodic Table, the preferred salts of these metals comprising the carboxylates or acetylacetonates. Specific examples of these salts will include the carboxylates such as palladium acetate, palladium propionate, palladium butyrate, palladium valerate, palladium caproate, platinum acetate, platinum propionate, platinum butyrate, platinum valerate, platinum caproate, rhodium acetate, rhodium propionate, rhodium butyrate, rhodium valerate, rhodium caproate, ruthenium acetate, ruthenium propionate, ruthenium butyrate, ruthenium valerate, ruthenium caproate, osmium acetate, osmium propionate, osmium butyrate, osmium valerate, osmium caproate, iridium acetate, iridium propionate, iridium butyrate, iridium valerate, iridium caproate, nickel acetate, nickel propionate, nickel butyrate, nickel valerate, nickel caproate, palladium acetylacetonate, platinum acetylacetonate, rhodium acetylacetonate, ruthenium acetylacetonate, osmium acetylacetonate, iridium acetylacetonate, nickel acetylacetonate, etc. In addition another component of the reaction mixture which will be present during the condensation comprises a salt of a transition metal. In the preferred embodiment of the present invention the salts of the transition metals will be organic salts and preferably carboxylates or acetylacetonates. The transition series metals will be selected from the group consisting of copper, cobalt, nickel, iron, manganese, chromium, vanadium, titanium, antimony and silver. Specific examples of the salts of the transition series metals which may be employed will include copper acetate, copper propionate, copper butyrate, copper valerate, copper acetylacetonate, cobalt acetate, cobalt propionate, cobalt butyrate, cobalt valerate, cobalt acetylacetonate, nickel acetate, nickel propionate, nickel butyrate, nickel valerate, nickel acetylacetonate, iron acetate, iron propionate, iron butyrate, iron valerate, iron acetylacetonate, manganese acetate, manganese propionate, manganese butyrate, manganese valerate, manganese acetylacetonate, chromium acetate, chromium propionate, chromium butyrate, chromium valerate, chromium acetylacetonate, vanadium acetate, vanadium propionate, vanadium butyrate, vanadium valerate, vanadium acetylacetonate, titanium acetate, titanium propionate, titanium butyrate, titanium valerate, titanium acetylacetonate, antimony acetate, antimony propionate, antimony butyrate, antimony valerate, antimony acetylacetonate, silver acetate, silver propionate, silver butyrate, silver valerate, silver acetylacetonate, etc.

If so desired, the reaction may be effected in an organic solvent medium, the preferred solvent compounds comprise alkyl carboxylic acids containing from about 2 to about 5 carbon atoms such as acetic acid, propionic acid, butyric acid, valeric acid, etc. In addition it is also contemplated within the scope of this invention that other organic solvents may also be employed, said solvents including alkyl ketones containing from 3 to about 6 carbon atoms such as acetone, methyl ethyl ketone, diethyl ketone, ethyl propyl ketone, etc., esters such as acetylacetone or dimethyl formamide, etc., dimethyl sulfoxide, acetonitrile, etc. although not necessarily with equivalent results.

The reaction conditions under which this reaction is effected will include temperatures ranging from about 20° up to about 200° C. or more. In addition, the reaction pressures at which the aromatic compound is reacted with the ethylenic compound will range from about atmospheric up to about 2,000 pounds per square inch or more, the pressure being supplied by an oxygen-containing gas such as air or oxygen which is required to be present in the reaction mixture. When superatmospheric pressures are employed, it is also contemplated within the scope of this invention that the oxygen-containing gas may afford only a partial pressure of the total desired pressures, the remainder of said pressure being provided for by the introduction of a substantially inert gas such as nitrogen into the reaction zone.

As hereinbefore set forth the reaction mixture is subjected to emission from a light source which possesses a wave length less than about 4,000A. By utilizing this photocatalysis method, it is possible to obtain the desired product in a single step, said product being obtained in relatively large yields. This is in comparison to prior art methods in which the vinylation of an aromatic compound with an ethylenic compound is effected in a catalytic process in the absence of ultra violet light. For example, when phenol is reacted with an ethylenic compound such as methyl acrylate in a catalytic reaction according to the prior art, the product which is obtained will comprise a mixture of coumarin, methyl ortho-coumarate and methyl para-coumarate. It is, therefore, necessary to further react the methyl coumarates in a second step in order to obtain the desired yield of coumarin. However, by effecting the reaction according to the process of the present invention in a photocatalytic manner, it is possible to obtain a greater yield of the desired product in a single step. The reaction of the present invention is effected by irradiating the reaction mixture including the starting materials of the aromatic compound and the ethylenic compound with a light source which possesses a wave length less than about 4,000A, and preferably less than about 3700A. One particular light source which may be utilized to effect the process of this invention comprises a medium pressure mercury arc lamp. This lamp usually contains a specific amount of mercury vapor and a large amount of a rare gas, the total pressure being above atmospheric. These mercury arc lamps possess strong emission lines at 2537A, 2900A and 3660A among others. It is also contemplated that a low pressure mercury lamp which contains a smaller amount of mercury vapor and larger amount of a rare gas, said lamp having a total pressure less than atmospheric, may also be used. In addition, another light source which may be utilized to effect the photocatalytic reaction of the aromatic compound and the ethylenic compound according to the process of the present invention, comprises a specifically prepared fluorescent light which will also emit energy at a desired wave length, that is, a large portion of the wave length no greater than 3700A. It is to be understood that these light sources are only representative of the sources which may be used to photocatalyze the reaction between the aromatic compound and the ethylenic compound, and that the present invention is not necessarily limited thereto.

The process of this invention may be effected in any suitable manner and may comprise either a batch or continuous type operation. When utilizing a batch type operation a quantity of the aromatic compound, the ethylenic compound as well as a salt of a metal of Group VIII and a salt of a transition series metal along with any solvent, if so desired, are placed in an appropriate apparatus. This apparatus may comprise a quartz reactor or a glass reactor, depending upon the wave length of the irradiation emission source. In addition, it is also contemplated within the scope of this invention that a reactor made of a synthetic material known in the trade as Vycor may also be used. In the event that atmospheric pressure is to be used, a stream of air or oxygen is charged to the reactor, if superatmospheric pressures are to be employed, the reactor is sealed and an oxygen-containing gas is pressed in until the desired operating pressure is reached. The resulting solution is then irradiated for a predetermined residence time accompanied by stirring or agitation, if necessary, to maintain intimate contact of the reactants, said residence time being in a range of from about 0.5 up to about 30 hours or more in duration. Upon completion of the aforementioned residence time, the irradiation is discontinued, the reactor, if at superambient temperature and/or superatmospheric pressure, is allowed to cool and/or the excess pressure is vented. The reaction mixture is recovered and subjected to conventional means of separation whereby the desired reaction products are separated from any unreacted starting materials, catalyst, etc., and recovered. These conventional means of separation may include filtration, fractional distillation, washing, drying, extraction, etc.

It is also contemplated within the scope of this invention that the photocatalytic process may be effected in a continuous manner of operation. When such a manner of operation is used, the starting materials comprising the aromatic compound and the ethylenic compound are continuously charged to a reaction zone comprising a quartz, glass or Vycor reactor. The reactor will contain the salts of the metal of Group VIII and the salt of a transition metal and will be maintained at the proper operating conditions of temperature and pressure. In addition, a stream of oxygen-containing gas such as air or oxygen which is necessary for effecting the reaction will also be continuously charged to the reactor. Furthermore if a solvent such as a lower molecular weight carboxylic acid is to be used, this solvent may be charged to the reactor through a separate line or admixed with one or both of the reactants and the resulting mixture charged thereto in a single stream. The reaction mixture is then subjected to irradiation from a light source of the type hereinbefore set forth in greater detail which possesses a wave length less than about 4,000A, and preferably less than 3700A, for a predetermined residence time. Upon completion of this residence time, the reactor effluent is continuously withdrawn and subjected to separation means of the type known in the art whereby the unreacted starting materials and/or side products are separated from the desired reaction product. The latter is recovered while the unreacted starting materials may be recycled to form a portion of the feed stock.

Examples of reaction products which may be prepared according to the process of this invention will include 2-phenylvinyl acetate, 2-phenylvinyl propionate, 2-phenylvinyl butyrate, 2-phenylvinyl valerate, 2-(2-hydroxyphenyl)vinyl acetate, 2-(3-hydroxyphenyl)vinyl acetate, 2-(4-hydroxyphenyl)vinyl acetate, 2-(2-methoxyphenyl)vinyl acetate, 2-(3-methoxyphenyl)vinyl acetate, 2-(4-methoxyphenyl)vinyl acetate, 2-methyl-3-phenyl acrylic acid methyl ester, 2-methyl-3-(2-hydroxyphenyl) acrylic acid methyl ester, 2-methyl-3-(2-methoxyphenyl) acrylic acid methyl ester, 3-phenylacrylic acid, 3-(2-hydroxyphenyl) acrylic acid, 3-(4-hydroxyphenyl) acrylic acid, 3-(2-methoxyphenyl) acrylic acid, 3-(2-chlorophenyl) acrylic acid, 3-phenylacrylic acid methyl ester, 3-(2-hydroxyphenyl) acrylic acid methyl ester, 3-(4-hydroxyphenyl) acrylic acid methyl ester, etc. It is to be understood that the aforementioned compounds are merely representative of the class of compounds which may be prepared according to the process described herein and that the present invention is not necessarily limited thereto.

The following examples are given to illustrate the process of the present invention which, however, are not intended to limit the generally broad scope of the present invention in strict accordance therewith.

EXAMPLE I

A mixture consisting of 19.5 grams (0.250 mole) of benzene, 10.7 grams (0.125 mole) of methyl acrylate, 0.6 grams (0.002 mole) of palladium acetylacetonate, 0.4 grams (0.002 mole) of copper acetate along with 30 grams (0.5 mole) of acetic acid is placed in a quartz tube provided with a reflux condenser. A stream of air is passed through the mixture while said mixture is exposed to light from mercury vapor lamps which possess a wave length of 2537A. The reaction tube is positioned equidistant from the lamps and is air cooled. After allowing the reaction to proceed for a period of 24 hours, the mixture is removed from the light source and subjected to analysis by means of a gas-liquid chromatograph. This analysis will disclose the presence of a major portion of methyl cinnamate.

EXAMPLE II

To a quartz tube is charged 94 grams (1.0 mole) of phenol, 17 grams (0.2 mole) of methyl acrylate, 60 grams (1.0 mole) of acetic acid, 0.6 grams (0.002 mole) of palladium acetylacetonate and 0.4 grams (0.002 mole) of copper acetate. Air is passed through the mixture while said mixture is subjected to emission from a series of mercury vapor lamps which have a wave length of 2537A. The reaction tube is air cooled and is maintained at ambient temperature for a period of 24 hours. At the end of this time, the tube is removed, the reaction mixture is recovered and subjected to chromatographic analysis. It will be found that a major portion of the reaction mixture comprises coumarin.

EXAMPLE III

To a glass reactor is charged a mixture comprising 19.5 grams (0.250 mole) of benzene, 6.6 grams (0.125 mole) of acrylonitrile, 0.098 grams (0.00025 mole) of platinum acetylacetonate and 0.045 grams (0.00025 mole) of copper acetate along with 30 grams (0.5 mole) of acetic acid. The reactor is placed between a bank of mercury vapor lamps which possess strong emission lines at 2537A. Air is bubbled through the reaction mixture while said mixture is irradiated for a period of 30 hours. At the end of the 30-hour period, the reactor is removed and the reaction mixture is analyzed by means of preparative gas-liquid chromatography. This analysis will disclose the presence of a major portion of beta-phenylacrylonitrile.

EXAMPLE IV

In like manner a mixture of 0.25 mole of benzene, 0.15 mole of vinyl acetate, 0.25 mole of acetic acid, 0.01 mole of palladium acetate and 0.01 mole of copper acetate are placed in a quartz reactor. The mixture is treated with air while being subjected to emission from mercury arc lamps which possess strong emission lines at 2537A for a period of 20 hours, the reactor being maintained at ambient temperature by means of air coolers. At the end of the 20-hour period, the reaction mixture is recovered and analyzed by means of preparative gas-liquid chromatography. This analysis will disclose the presence of a major portion of 2-phenylvinyl acetate.

EXAMPLE V

A glass reactor provided with a reflux condenser is charged with a mixture of 52 grams (0.665 mole) of benzene, 10 grams (0.10 mole) of allyl acetate, 0.6 grams (0.002 mole) of palladium acetylacetonate, 0.4 grams (0.002 mole) of copper acetate and 30 grams (0.5 mole) of acetic acid. While a stream of air is bubbled through the reactor, the mixture is subjected to emission from a bank of mercury vapor lamps which possess a wave length of 2537A. The irradiation of the mixture is continued for a period of 24 hours while air cooling the reactor in order to maintain ambient temperature. After recovery of the reaction mixture, preparative gasliquid chromatographic analysis will disclose the presence of a major portion of cinnamyl acetate.

We claim as our invention:

1. A process for the photocatalytic vinylation of an aromatic compound possessing the generic formula:

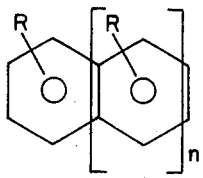

in which R is selected from the group consisting of hydrogen, hydroxyl, alkyl, alkoxyl, aryl, alkaryl, aralkyl, cycloalkyl and halogen radicals and $n$ is an integer of from 0 to 2, which comprises reacting said aromatic compound with an ethylenic compound possessing the formula:

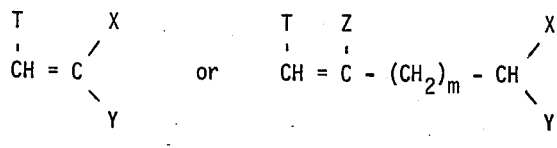

in which T, X, Y and Z are selected independently from the group consisting of hydrogen, alkyl,

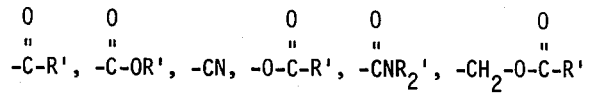

and OR' radicals, R' being selected from the group consisting of hydrogen, alkyl, aryl, cycloalkyl, aralkyl and alkaryl radicals, and $m$ is an integer of from 0 to 16 in the presence of an organic salt of a metal of Group VIII, an organic salt of a transition metal and an oxygen-containing gas at reaction conditions, said mixture being exposed to the emission from a light source having a wave length of less than 4,000A.

2. The process as set forth in claim 1 in which said reaction conditions include a temperature in the range of from about 20° to about 200° C. and a pressure in the range of from atmospheric to about 2,000 pounds per square inch.

3. The process as set forth in claim 1 in which said light source is ultra violet light.

4. The process as set forth in claim 1 in which said salt of a metal of Group VIII is palladium acetylacetonate and said salt of a transition metal is copper acetate.

5. The process as set forth in claim 1 in which said salt of a metal of Group VIII in platinum acetylacetonate.

6. The process as set forth in claim 1 in which said salt of a metal of Group VIII is palladium acetate.

7. The process as set forth in claim 1 in which said aromatic compound is phenol and said ethylenic compound is methyl acrylate.

8. The process as set forth in claim 1 in which said aromatic compound is benzene and said ethylenic compound is methyl acrylate.

9. The process as set forth in claim 1 in which said aromatic compound is benzene and said ethylenic compound is acrylonitrile.

10. The process as set forth in claim 1 in which said aromatic compound is benzene and said ethylenic compound is allyl acetate.

11. The process as set forth in claim 1 in which said aromatic compound is benzene and said ethylenic compound is vinyl acetate.

12. The process as set forth in claim 1 further characterized in that said metal salts are carboxylates or acetylacetonates.

13. The process as set forth in claim 1 further characterized in that said Group VIII metal is platinum or palladium.

* * * * *